G. B. Jewett,
Sofa.
No. 104,319.  Patented June 14, 1870.

Witnesses
S. N. Piper
L. N. Möller

Geo. B. Jewett
by his attorney
R. H. Eddy

United States Patent Office.

GEORGE B. JEWETT, OF SALEM, MASSACHUSETTS.

Letters Patent No. 104,319, dated June 14, 1870.

IMPROVEMENT IN EARTH-CLOSETS.

The Schedule referred to in these Letters Patent and making part of the same.

*To all persons to whom these presents may come:*

Be it known that I, GEORGE B. JEWETT, of Salem, of the county of Essex and State of Massachusetts, have made a new and useful invention having reference to "Earth-Closets;" and do hereby declare the same to be fully described in the following specification and represented in the accompanying drawing, of which—

Figure 1:
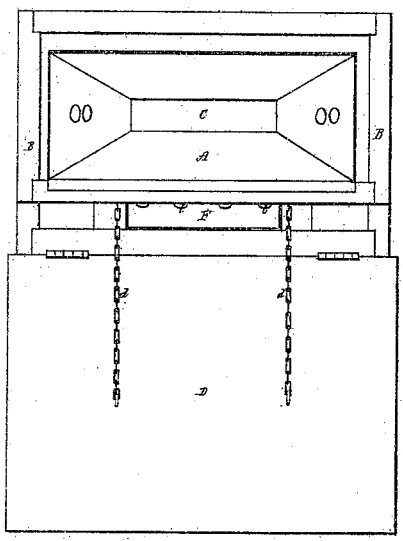
Figure 3:
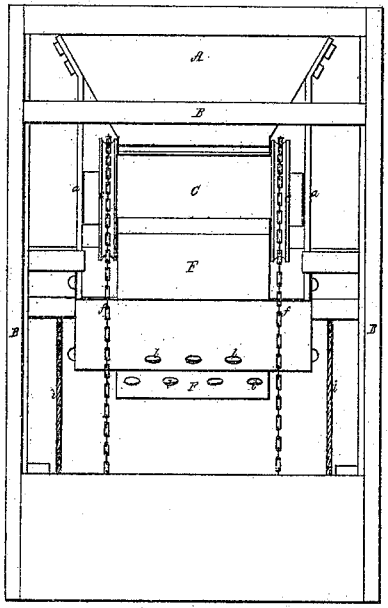
Figure 2:
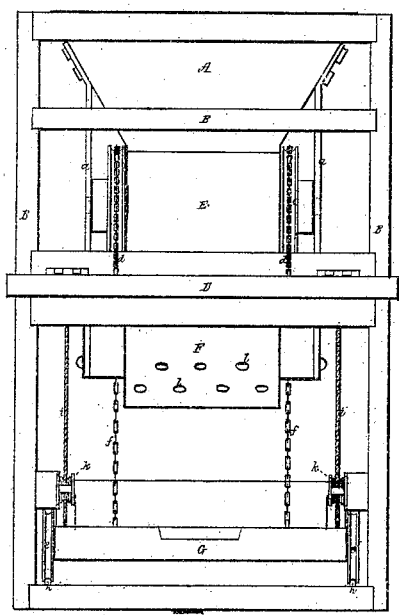

Figure 1 denotes a top view,

Figure 2, a front elevation,

Figure 3, a rear elevation, and

Figure 4:
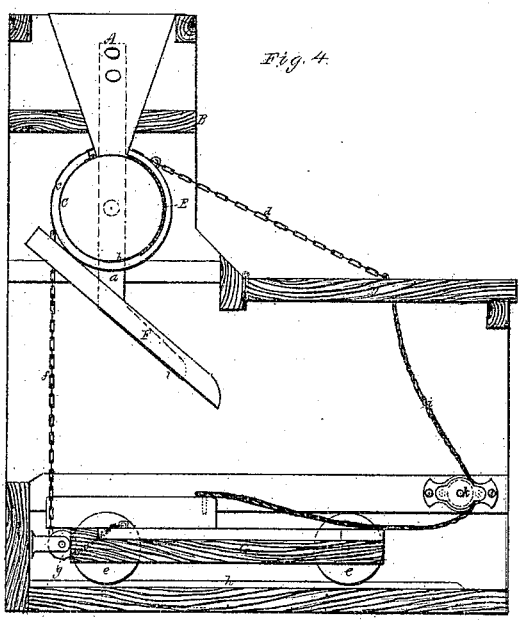

Figure 4, a vertical central and longitudinal section of an earth-closet provided with my invention.

Such invention involves a rotary discharger, a movable hod-carrier or supporter, and mechanism for operating them by means of the seat-cover, as hereinafter described, in combination with a hopper and chute, or with such and a curved apron extending from the hopper partially about the rotary discharger, as hereinafter described.

In the drawing—

A denotes the hopper, as arranged within the seat-frame B in the ordinary way, and directly over a cylindrical drum or discharger, C, pivoted at its ends to two standards, $a$ $a$, so as to be capable of being freely revolved on its axis.

There is a mouth or opening, $b$, in the side of the drum or discharger, and the heads $c$ $c$ of such discharger are grooved or formed as pulleys or wheels, and have fastened to their peripheries two chains, $d$ $d$, which are extended from the cover D of the seat, the latter, viz., the seat, not being represented in the drawing.

From the hopper an apron, E, of sheet metal, projects and extends partially around the drum C, in manner as shown in the drawing, such apron being to prevent the earth from being prematurely discharged from the drum while the latter may be in the act of being revolved for the purpose of dropping its load upon a chute, F, arranged below the drum or discharger in manner as represented.

Below the said chute is the hod-carrier G, which is a carriage provided with ears $e$ $e$, resting on rails $h$ $h$, or otherwise arranged, so as to be capable of moving or being moved backward, from a position immediately underneath the seat, the necessary distance for the proper discharge of earth by the chute into the hod.

Chains $f$ $f$, fastened to the peripheries of the heads of the drum C, extend downward around guide-pulleys $g$ $g$, supported by the seat-frame, and thence to and are fastened to the rear part of the hod-carrier G.

To the carriage G other chains or ropes $i$ $i$ are fixed, and are extended forward underneath other guide-pulleys $k$ $k$, supported by the seat-frame, the whole being in manner as represented.

If desirable, the lower part of the chute may be perforated with holes, as shown at $l$ $l$, in order to enable it to better distribute upon the excremental and urinal deposits of the hod, the earth for covering such.

From the above it will be seen that the seat-cover, while being raised from a horizontal into an upright or nearly vertical position, will draw, by means of the ropes $i$ $i$, the hod-carrier G forward to a position directly underneath the seat. Also, that the hod-carrier, while being so moved, will, by means of the chains connecting it with the rotary discharger C, cause such discharger to revolve so as to carry its mouth around to the opening of the lower end of the hopper, such being in order for the discharger to receive from the hopper a charge of earth, which, by the action of gravity, will be made to descend from the hopper into the discharger.

Next, after the closet may have been used by a person, he is to lay hold of and depress the cover of the seat, in which case not only will the hod-carrier be retracted, but the discharger will be revolved, so as to carry its mouth beyond or below the apron, whereby the earthy contents of the discharger will be caused to fall therefrom upon the chute, and by it into the hod.

The object of having the carrier to be advanced and retracted in manner as specified is not only to enable the chute to be arranged far enough back of the hod, so as not to be soiled by either urinal or excremental deposits, but, to insure the proper delivery of the covering matter into the hod, and the diffusion or dispersion of such matter over a deposit of excrement in such hod.

The hod, tub, or vessel to receive the excrement is not shown in the drawing, it being of the usual kind, and to be placed on the carriage G.

The apron may be dispensed with, but when used it prevents any premature ejection of the earth from the discharger while it may be in revolution, as explained.

I claim as my invention the following, that is to say:

The combination of the rotary drum or discharger C, the movable carriage or hod-carrier G, and mechanism for operating them, in manner as described, by the seat-cover D, with the hopper A, and the chute F.

Also, in combination therewith, the apron E, arranged with the hopper A and the rotary discharger C, as and for the purpose as specified.

Also, in the earth-closet constructed substantially in the manner and to operate as set forth, the chute, as provided with the perforations arranged in its lower part, such part being for the better distribution or diffusion of the earth upon the excremental and urinal deposits in the hod.

GEO. B. JEWETT.

Witnesses:
A. HUNTINGTON,
GEO. R. LORD.